March 8, 1955 P. L. LAW ET AL 2,703,640
COIN-OPERATED ARTICLE DISPENSING SYSTEM
Filed Feb. 1, 1950 4 Sheets-Sheet 1

FIG.1

Inventors
Alan D. Lackey
Peter L. Law
By Ward, Crosby & Neal
Attorneys

March 8, 1955 P. L. LAW ET AL 2,703,640
COIN-OPERATED ARTICLE DISPENSING SYSTEM
Filed Feb. 1, 1950 4 Sheets-Sheet 2

Inventors
Alan D. Lackey
Peter L. Law
By Ward, Crosby & Neal
Attorneys

FIG. 3

Inventors
Alan D. Lackey
Peter L. Law
By Ward, Crosby & Neal
Attorneys

United States Patent Office 2,703,640
Patented Mar. 8, 1955

2,703,640
COIN-OPERATED ARTICLE DISPENSING SYSTEM

Peter Lincoln Law, Roseville, near Sydney, New South Wales, and Alan D. Lackey, McMahon's Point, near Sydney, New South Wales, Australia, assignors to Communication Engineering Pty. Limited, Cammeray, near Sydney, New South Wales, Australia, a corporation of Australia Application February 1, 1950, Serial No. 141,642

Claims priority, application Australia February 15, 1949

12 Claims. (Cl. 194—7)

The invention relates to article dispensing systems and more particularly to such systems in which the customer can select the articles himself, but in which the articles are only delivered after an amount in coins equal to the value of the articles selected has been inserted.

In systems of this kind it has been proposed to provide arrangements whereby a customer can select the various kinds of articles he wants, the added up price of these articles being indicated on a price indicator. At the end of an order the customer then inserts the coins corresponding to the indicated price into a coinbox or the like, and when the amount tendered by the customer corresponds with the amount indicated at the price indicator, the various selected articles are delivered to the customer.

Arrangements of this kind, however, have the disadvantage that no safeguards against misuse of the article dispensing system are provided. When, for example, a customer does not tender the proper amount at the end of the selection, all the articles although not delivered to the customer, have been released from their respective shelves and thus have to be put back on to the shelves later on at the expense of the shopkeeper.

According to the invention this difficulty is overcome by the provision of means which permit to start the selection of articles of various character only after one or more coins or other tokens have been inserted as a deposit which is collected by the dispensing apparatus and will be accounted for in the total price of the selected articles.

When the customer has selected his order, he pays the difference between the deposit he has placed in the coinbox when starting his order and the total price of the selected articles. As soon as he has tendered the proper tokens the articles will be delivered to him.

If, however, the customer at the end of his order does not tender the proper amount for the articles he has selected, his deposit is forfeited, as it will not be returned to him.

According to another feature of the invention provision is made to refund the deposit inserted into the coinbox instead of delivering selected articles as long as the added-up price of the selected articles does not exceed the amount deposited.

As soon as a customer, however, selects articles exceeding the amount placed into the coinbox as deposit, this deposit can no longer be recovered from the coin-operated article dispensing system even if the customer decides not to take delivery of the selected articles.

It is a further feature of the invention to provide means for the refund of tokens inserted after the selection has been made as long as the amount tendered by a customer does not reach the added-up price for his order.

It is another feature of the invention to provide means for re-setting the whole arrangement when a customer after having inserted the deposit abandons the order without having completed it.

These and other features of the invention will be more clearly understood from the following description in connection with the drawings.

Before the various circuits are described in detail, a general description of the new arrangement will be given hereafter.

Only those parts which relate to the coin operation of an article dispensing system are shown in detail in the drawing, while other parts of the article dispensing system are only shown schematically.

In the example shown the coin operated parts of the system can be used in connection with article dispensing systems, which are at times operated by an operator, and in which the customer pays the price indicated at a price indicator to a cashier in the shop. It must be understood, however, that the article dispensing system could be coin operated all the time.

Figure 1:
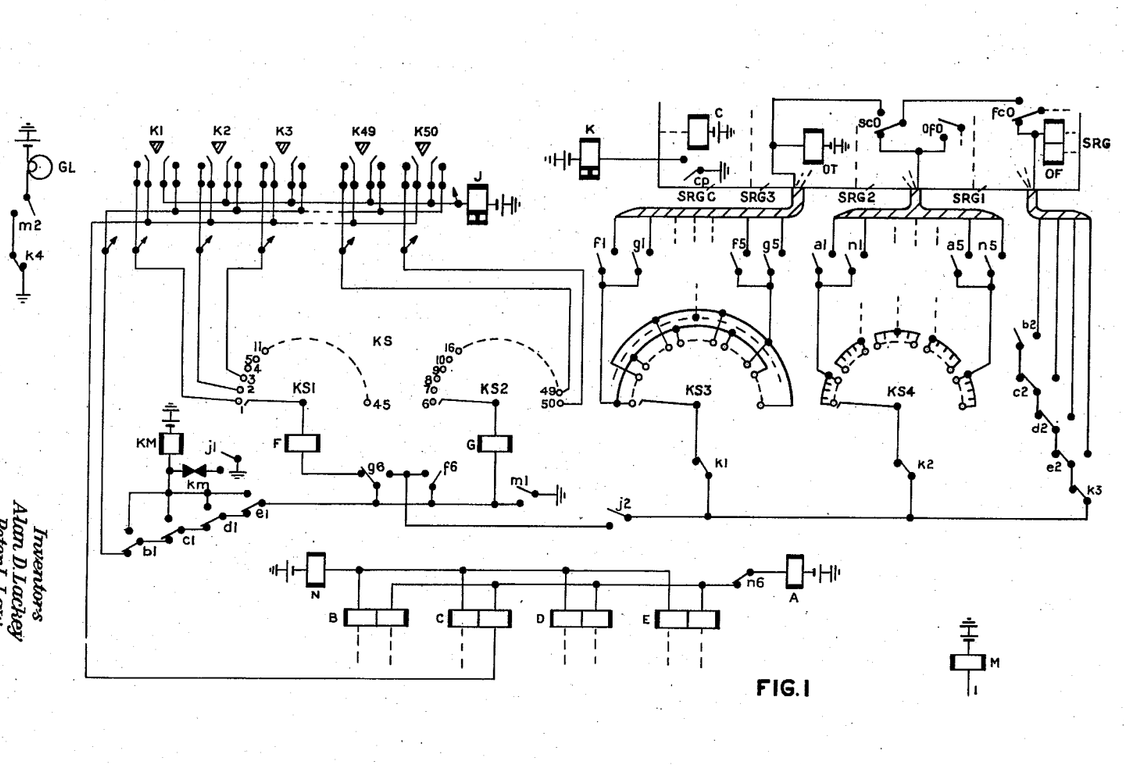
Fig. 1 shows the circuit diagram for the keying arrangement in a coin operated article dispensing system.

It may be assumed that the article dispensing system is designed for the delivery of 400 different kinds of articles, whereby each kind of article is defined by a three-digit stock number. The selection of the article itself is then carried out via a selecting relay group, which is schematically indicated at Fig. 1 by the designation SRG. Such a selecting relay group is for example described in detail in U. S. Patent No. 2,611,814 to P. L. Law.

Figure 3:
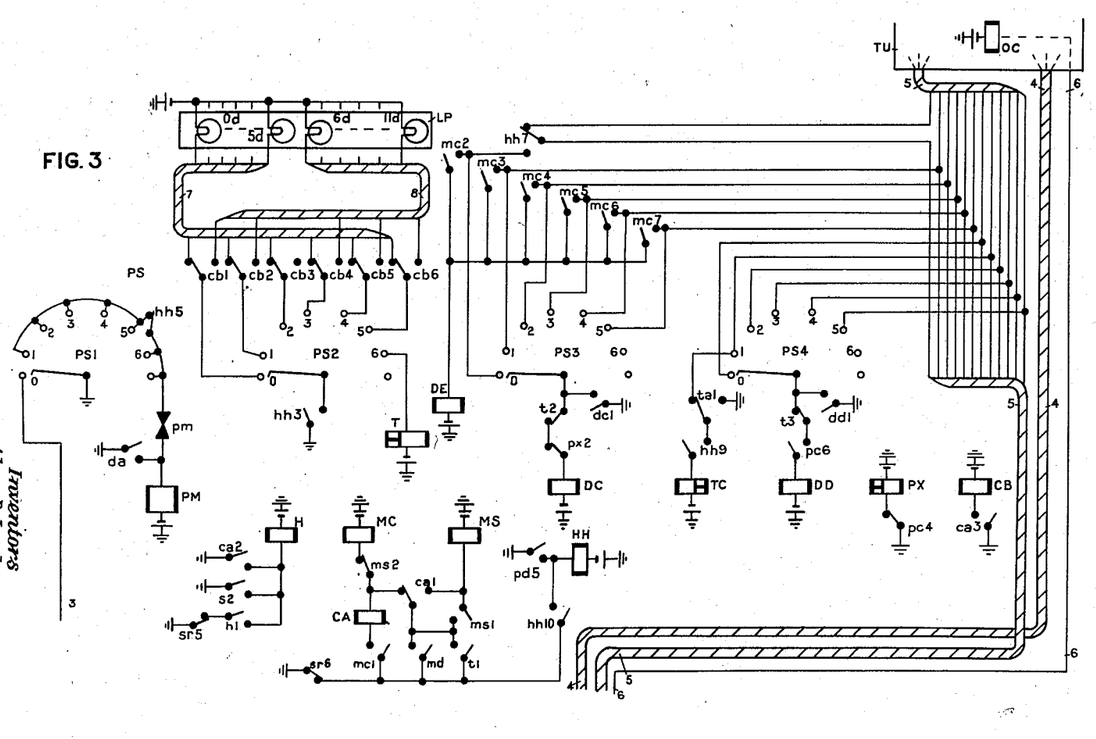
Figs. 3 and 4 show the circuit diagram of the control unit in a coin operated article dispensing system.
Figure 4:
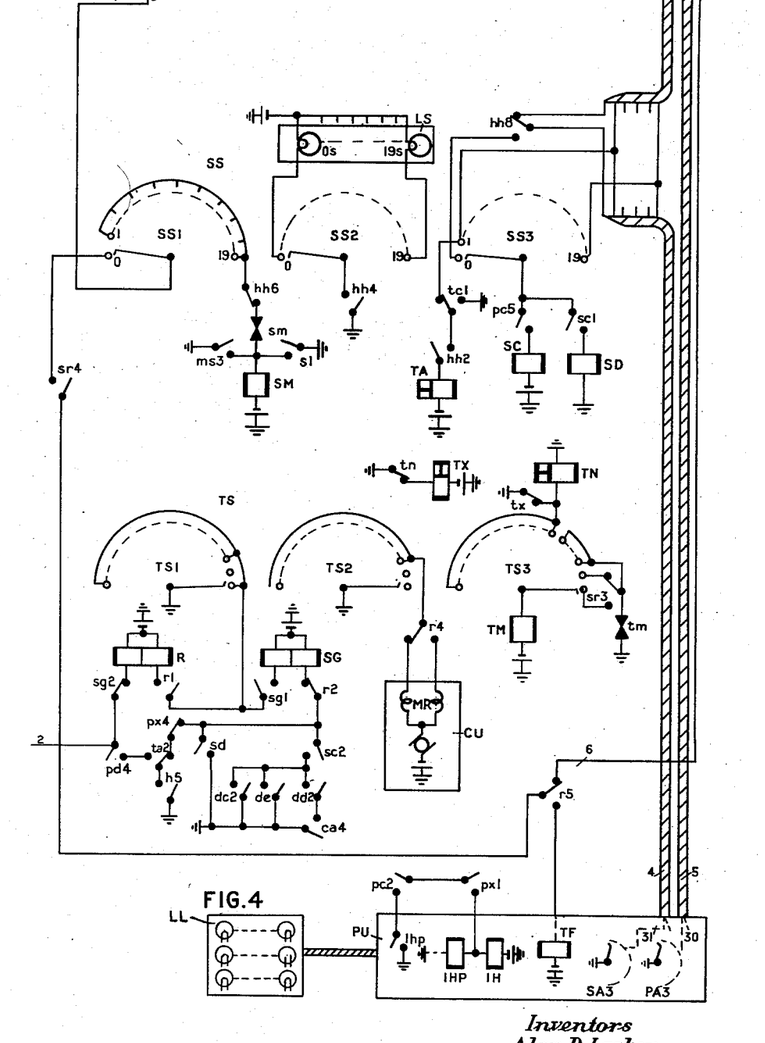
Figure 5:
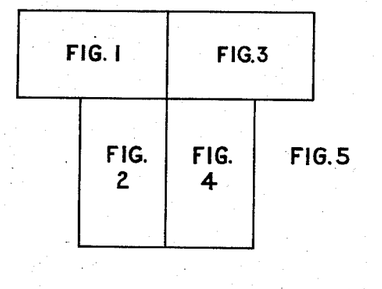
Fig. 5 shows how Figs. 1, 2, 3 and 4 have to be arranged to complete the circuit diagram.

The indication of the added-up price of selected articles of one order as well as the totaling of the cost of articles selected during a certain time period, is carried out by a pricing unit PU, schematically shown in Fig. 4, and the corresponding totalling unit TU indicated in Fig. 3. No details of these units are given herein as they do not form part of this invention. Circuits for these units, which could be used in connection with this invention are, for example shown in U. S. Patent No. 2,608,348 to P. L. Law.

Articles released from storage are collected by a conveyor unit, schematically indicated by CU in Fig. 4. This conveyor unit includes a conveyor which is normally stationary and can be driven in opposite directions by a reversible motor MR to either transport selected articles to a delivery counter or back to the store, as will be described later on. Any suitable known type of motor-driven conveyor may be used for this purpose. One such conveyor is shown for example, in U. S. Patent 1,645,694 to Esgro (member 42 in Figs. 1 and 2).

To facilitate the selection of articles by a customer, a separate key is provided for each kind of article, and 50 keys are always combined in a selection frame carrying a sample of the article alongside each key.

In Fig. 1 some of the keys are shown and marked as K1, K2, K3 . . . K49 and K50. Alongside the keys at each selecting frame a green lamp GL is arranged, which lights as soon as the customer has inserted his deposit and is extinguished during the release of an article from storage.

As mentioned before, the article dispensing system provides, in the example shown, for 400 different items, and thus eight selecting frames with fifty keys each are provided in the system. To transmit the operation of the keys to the selecting relay group SRG for the selection of an article, each group of fifty keys is connected with the winding of a corresponding relay indicated in Fig. 1 by the relays B, C, D and E. Each of these relays has two windings, so that each relay is used for the selection of 100 different articles, either over the first or the second winding. All groups of keys are connected in parallel with a selector switch KS and a control relay J as indicated by the arrows at the leads from the keys to switch KS and relay J.

Whenever one of the keys to select an article is pressed, the selector switch KS with four banks and wipers KS1, KS2, KS3 and KS4 is operated, and this switch hunts for the key representing the wanted kind of article, and transmits the indication over its banks KS3 and KS4 to the selecting relay group SRG.

The selecting relay group SRG comprises a section SRG1 for the selection of the first digit of a stock number allotted to a particular kind of article, a section SRG2 for the selection of the second digit, a section SRG3 for the selection of a third digit and a control section SRGC. As the circuit of the selecting relay group is shown in detail in the abovementioned Patent No. 2,611,814 only some of the parts are shown to indicate the connections between the selecting relay group SRG and the circuits of Fig. 1. As the abovementioned Patent No. 2,611,814 describes how release relays may be energised through the selecting relay group to effect the release of selected articles, no description of this operation is given here. It may be mentioned here that the contact cp in section SRGC is an additional contact on relay C of this section.

The first digit of the stock number allotted to the wanted article is transmitted to that part of the selecting relay group SRG which deals with the first digit selection (in Fig. 1 indicated as SRG1) and which is operated by a contact of one of the relays B, C, D or E.

The second digit is selected via the selecting relay group SRG2 over the contact bank KS4, while the third and last digit is selected by the relay group SRG3 over the contact bank KS3.

As soon as the final selection has been made, contact cp in the common equipment of the selecting relay group SRG (indicated as SRGC in Fig. 1) is closed, and operates relay K, which prevents a new selection if the prior selection has not been finished as will be described later on.

Figure 2:
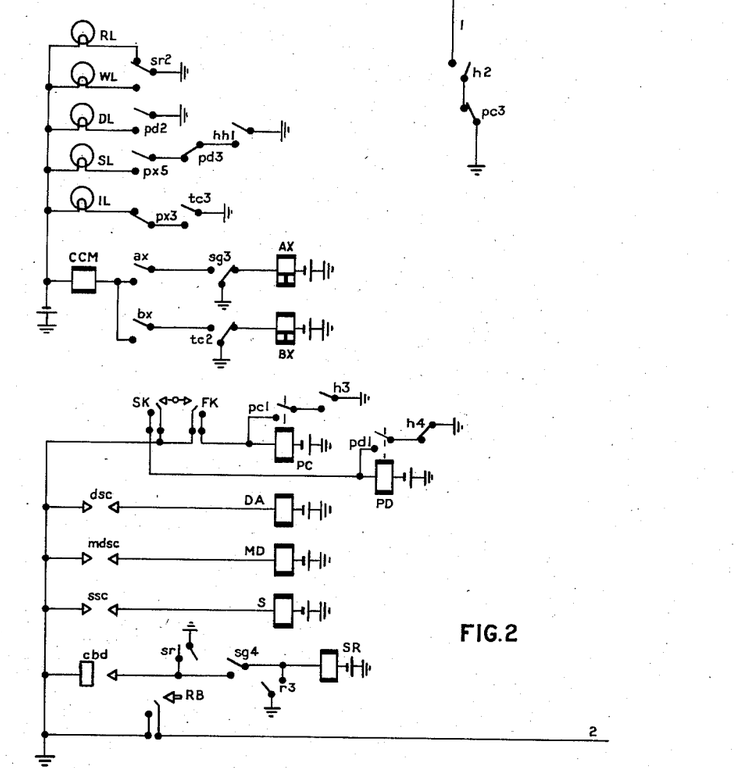
Fig. 2 shows the circuit diagram of the coinbox and corresponding relays.

The various functions described so far can only be fulfilled when the customer has put a deposit into the coinbox, electrical details of which are shown in Fig. 2. The structural details of the coinbox are not illustrated, as many suitable devices of this kind are known, particularly in the telephone art. Reference is made by way of example to the single button prepayment coinbox described and illustrated on page 174 of Telephony (vol. 1) by J. Atkinson (Sir Isaac Pitman and Sons Ltd., London 1948).

The coinbox has slots for the insertion of pennies, sixpence coins and shilling coins, and the coins, when inserted, close corresponding contacts indicated in Fig. 2 by the contacts dsc, mdsc and ssc respectively which operate the relays DA, MD and S respectively and certain other relays, whose functions will be described later. A coin collecting magnet CCM and a coin collecting contact cbd are also incorporated in the coinbox.

To indicate to the article dispensing system that the customer wishes to start an order, a "Start" key SK is provided at the coinbox and this key is combined with a "Finish" key FK which is operated when the customer has completed his order, indicating that no further articles will be selected. These keys operate the relays PD and PC respectively.

If the customer wants to cancel his order after he has inserted a certain amount of money, or if he wants to regain his deposit before he has keyed up any article, he operates a refund button RB connected with the coinbox. By this operation the money is refunded and the whole system is restored for the next selection.

A number of indicating lamps are also arranged at the coinbox to give the customer an indication about the various steps he has to take. The lamp RL indicates that the system is ready for the customer's operation, while the lamp WL gives an indication that the customer has to wait for the delivery of selected articles. A lamp DL reminds the customer that he has to put in the deposit, while the lamp SL tells him that he can start with the selection of the wanted kind of article.

When the customer has finished his order, the lamp IL indicates to him that he has now to insert the money in conformity with the price indicated at a price indicator LL to get delivery of the articles he has selected.

To check the amount of money the customer has inserted in the coinbox against the added up price indicated at the price indicator LL of the pricing unit PU (Fig. 4) a separate control unit is provided as shown in Figs. 3 and 4 of the drawings. This control unit includes a rotary switch PS (Fig. 3) with four contact banks and wipers PS1, PS2, PS3 and PS4 and a lamp panel LP, on which the penny amounts inserted by the customer are progressively indicated.

A similar arrangement for the shillings amount is provided and shown by the rotary switch SS (Fig. 4) with the three contact banks and wipers SS1, SS2 and SS3, and the shilling lamp panel LS.

In addition a rotary switch TS with the contact banks and wipers TS1, TS2 and TS3 controls the delivery of selected articles and resets the whole arrangement.

As mentioned before the final delivery belt (conveyor unit CU) on to which the articles are released from their various shelves is normally kept stationary, and is only driven in the forward direction when the amount inserted by the customer coincides with the amount indicated by the lamp indicator LL. In case the customer does not tender the proper amount, or cancels his order, the motor MR of the conveyor unit CU (Fig. 4) is reversed and the articles collected on the delivery belt are then transferred back to the store to be distributed to the various shelves later on.

The operation of the various circuits will now be described in detail. All relays are marked with capital letters and their contacts are marked with the corresponding small letters followed by a figure indicating the number of the respective contact. All the relays are shown in their unoperated position but the relays having a reference containing the letter X are normally operated and so are their corresponding contacts. The "detached contact" method is used in the circuit diagram, whereby the contacts are not shown next to the relays to which they belong, but in the position in which they appear in the circuits, to simplify the circuit diagram. The rotary switches used in the circuits are uniselector switches so arranged that the wiper is stepped forward when the magnet operating the switch releases again after having been energised.

When a customer wants to make a selection of articles he operates first of all the "Start" key SK (Fig. 2).

As soon as the customer has operated the key SK, relay PD is energised closing a locking circuit for itself over contact pd1 and contact h4 to earth. Over operated contact pd2 the "Deposit" lamp DL lights up indicating to the customer that he has to put his deposit into the coinbox. Contact pd3 interrupts the circuit between contacts hh1 and px5 (which is normally closed) thus prohibiting the lamp SL from lighting up when relay HH (Fig. 3) is energised over contact pd5. Contact pd4 (Fig. 4) prepares a circuit for relay R for future use.

The relay HH (Fig. 3) closes a locking circuit for itself over contact sr6 and operated contact hh10. Over its other contacts this relay prepares the control unit for further action. At contact hh2 (Fig. 4) relay TA is connected via contact tc1 with contact bank SS3 of rotary switch SS. Contact hh3 (Fig. 3) puts earth on to wiper of contact bank PS2 and thus lights the first lamp (0d) in the penny lamp indicator LP. Over contact hh4 (Fig. 4) and wiper of contact bank SS2 the first lamp (0s) of indicator LS lights up, thus giving an indication that the arrangement is ready for working but that no money has been inserted yet in the coinbox. Furthermore, relay HH operates its contacts hh5 to hh9 but the functions of these contacts will be described later on in connection with the circuits.

The customer being informed by lamp DL to insert his deposit (6d. in the example shown shown) inserts 6 pennies or a sixpence coin in the appropriate coin slot. If he inserts 6 pennies one after the other in the coin slot dsc (Fig. 2) a circuit is closed temporarily six times for relay DA, which operates six times its contact da (Fig. 3) and thus magnet PM steps the wipers of switch PS forward six steps. As contact hh5 is opened the magnet PM cannot operate over its self-interrupting contact pm until the wiper PS1 has reached the sixth contact. Then the magnet PM returns the wipers of switch PS back to its initial position. In the meantime however slow-release relay T has been operated from earth over operated contact hh3, wiper PS2, bank contact 6, relay T to battery. At contacts t2 and t3 circuits from the wipers PS3 and PS4 respectively are interrupted and at contact t1 a circuit is closed for relay MC from earth via contact sr6, operated contact t1, contacts ca1 and ms2 relay MC to battery.

Relay MC closes its contacts mc1 to mc7. Contacts mc2 to mc7 connect relay DE with the leads of cable 5 connecting the pricing unit PU (Fig. 4) with the totalling unit TU (Fig. 3) to transmit the penny price indications for selected articles to the totalling message registers. The pricing unit PU and the totalling unit TU are shown in detail in the abovementioned Patent No. 2,608,348. The relays 1HP, 1H and TF in pricing unit PU are marked with the same references in Fig. 2 of the above patent, contact 1hp being added and operated by relay 1HP. The rotary switches PA3 and SA3 are shown in Fig. 6 of the abovementioned patent and the cables 30 and 31 connecting the pricing switches with the totalling switches in the arrangement of Patent No. 2,608,348 are replaced by the cables 5 and 4. The totalling unit TU in Fig. 3 is shown in detail in Figs. 7 and 8 of the Patent No. 2,608,348, and only relay OC has been shown here to indicate how this relay is operated to carry out the release of the various circuits in the pricing and totalling units. The leads of cable 5 are further connected with corresponding contacts of the contact banks PS3 and PS4. As the wiper PA3 in the pricing unit PU (Fig. 4) in its normal position connects earth to the first lead in cable 5, relay DE (Fig. 3) is energised over make contact $hh7$ and contact $mc2$ and closes its contact $de$ (Fig. 4) for future use. To prohibit an operation of the totalling unit TU (Fig. 3) over relay DE the first lead of cable 5 is interrupted at break contact $hh7$. A similar arrangement is made with regard to the shilling indications. The leads of cable 4 transmitting these indications are connected with contact bank SS3 (Fig. 4), the first lead being interrupted at break contact $hh8$.

Contact $mc1$ (Fig. 3) of relay MC prepares a new circuit for relay MC in series with relay CA which is short circuited by contacts $t1$ and $ca1$ but will operate as soon as relay T releases after return of switch PS to its initial position.

In case the customer inserts a sixpence coin in the corresponding slot $mdsc$ (Fig. 2) the relay MD is temporarily operated. The rotary switch PS (Fig. 3) remains in its initial position and relay MC is energised from earth over contact $sr6$, operated contact $md$, contacts $ca1$ and $ms2$, relay MC to battery. On the release of relay MD the relays CA and MC are energised in series from earth via contact $sr6$, operated contact $mc1$, relay CA, contact $ms2$, relay MC to battery.

The relay CA prepares a circuit for relay MS at contact $ca1$. Over contact $ca2$ relay H is energised and over contact $ca3$ relay CB is operated. At contact $ca4$ (Fig. 4) a circuit is prepared for relay SG. Relay CB changes over its contacts $cb1$ to $cb6$ and thus the 6d. lamp in the indicator lamp panel LP lights up from earth via operated contact $hh3$, wiper PS2 on contact O, contact $cb1$, cable 3, lamp 6d. to battery. This lamp indicates to the customer that his 6d. deposit has been registered correctly. Relay H prepares a new circuit for itself over contact $sr5$ and contact $h1$. Closing of contact $h5$ (Fig. 4) is not effective yet. At contact $h4$ (Fig. 2) the locking circuit for relay PD is interrupted so that this relay releases, extinguishes lamp DL at contact $pd2$ and closes a circuit for the "select" lamp SL from earth over operated contact $hh1$, contact $pd3$, normally operated contact $px5$, lamp SL to battery. Contact $h3$ prepares a holding circuit for relay PC, when this relay is operated later on. Contact $h2$ closes a circuit from earth via contact $pc3$, operated contact $h2$, lead 1, relay M (Fig. 1) to battery to prepare the keying unit (shown in Fig. 1) for selection. At contact $m1$ earth is connected to the keyset K1 to K50 via the contacts $e1$, $d1$, $c1$ and $b1$. Contact $m2$ lights the green lamp GL to indicate at the keyset that the customer can start his selection.

The customer now presses the key corresponding to the article he wants. It may be assumed that the key K3 is pressed. Relay J operates over key K3, contacts $b1$, $c1$, $d1$, $e1$ and $m1$ to earth. Contact $j1$ starts a self-interrupting circuit for magnet KM via contact $km$ and steps the rotary switch KS forward until wiper KS1 reaches the contact 3. As a second contact set of key K3 prepares a circuit from battery over relay A, contact $n6$, one winding of relay C, key K3 to contact 3 of contact bank KS1, a circuit for relays A and C is now completed over relay F, contact $g6$, operated contact $m1$ to earth. Relay A closes its contacts $a1 \ldots a5$ to connect wiper and contact bank KS4 with the second digit relay group SRG2, relay F closes contacts $f1 \ldots f5$ to connect the third digit relay group SRG3 with wiper and contact bank KS3, and at contact $f6$ connects earth from contact $m1$ over contacts $f6$ and $j2$ with the wipers KS3 and KS4 over contacts $k1$ and $k2$ respectively. Relay C operates its contacts $c1$ and $c2$. At contact $c1$ earth is changed over from the keyset to the magnet KM to keep it energised interrupting at the same time the circuit for relay J which being a slow-release relay keeps its contacts $j1$ and $j2$ closed for a short time. At contact $c2$ earth from contact $m1$ is applied via contacts $f6$, $j2$, $k3$, $e2$, $d2$ and $c2$ to one of the leads to the first digit relay group SRG1. Thus earth is applied to the three relay groups SRG1, SRG2, SRG3 to perform the selection and release of an article from storage. Details of the selection are not shown as they are not part of this invention, but it is clear that the selection depends on the grouping of the various leads at the contact banks of the switch KS as indicated in Fig. 1. The parts OF, $fcO$, $OfO$, $scO$, OT and C indicated in the selecting relay group SRG are identical with the correspondingly marked parts in the arrangement of the abovementioned Patent No. 2,611,814, and are only indicated schematically to show the connections between the circuits of Fig. 1 and the selecting relay group SRG. The contact $cp$ in the section SRGC is an additional contact operated by relay C for the operation of relay K. As soon as the relay groups have operated a contact $cp$ in the common section SRGC closes a circuit for slow-release relay K which removes earth at contacts $k1$, $k2$ and $k3$ from the selecting relay group sections SRG1 to SRG3 and extinguishes at contact $k4$ the lamp GL. In the meantime relay J has released. When the customer releases key K3 the circuit is broken for relays A, G and F. When the selected article is released from storage contact $cp$ opens again releasing relay K and the whole keying unit is ready for the next selection.

In case the customer presses another key before relay K has released, no selection will be made as the circuits to the selecting relay group sections are still broken at contacts $k1$, $k2$ and $k3$. The green light GL, which lights up again when contact $k4$ closes, indicates to the customer that he can make his next selection.

The selection of the first digit depends on the operation of one of the relays B, C, D or E (as 400 different kinds of articles are provided in the embodiment described). These relays have two windings each, and each winding is connected with a group of 50 keys as mentioned before. While the contacts $b1$, $c1$, $d1$, $e1$ all act in the same way on magnet KM, the contacts $b2$, $c2$, $d2$, $e2$ select the various leads for operation of the first digit section SRG1. While the first windings of the relays B, C, D, E are connected in series with relay N, the second windings of these relays are connected in series with relay A, thus distinguishing the keysets at the leads to the second digit section SRG2 by the contacts $n1 \ldots n5$ and $a1 \ldots a5$ respectively. Twenty-five keys of each keyset are checked by wiper KS1 and relay F while the other twenty-five keys are checked by the wiper KS2 and relay G. This enables a selection via the contact $f1 \ldots f5$ and $g1 \ldots g5$ of the leads to the third digit section SRG3.

To prohibit a simultaneous selection of two articles (which would disturb a proper price indication) the relay G when operated, interrupts at contact $g6$ the circuit for relay F and a similar arrangement is made to interrupt the circuit for relay A at contact $n6$ of relay N.

While articles are released from storage their prices are indicated at the price indicator unit PU (Fig. 4) and earth is applied for penny amounts over switch PA3 and for shilling amounts over switch SA3 to corresponding leads in the cables 5 and 4 respectively leading to the totalling unit TU (Fig. 3). As soon as the switch PA3 in pricing unit PU (Fig. 4) passes the 7d. mark, earth is applied to the corresponding lead in cable 5, which is connected with contact 1 of the contact bank PS4 (Fig. 3) and thus energises via contact $ta1$ and operated contact $hh9$ relay TC. This relay changes over contact $tc1$ (Fig. 4) and operates relay TA over contact $hh2$. At contact $tc2$ (Fig. 2) it energises via the normally operated contact $bx$ the collecting magnet CCM which thus transfers the deposit inserted into the coinbox to a collecting receptacle. After a short time delay the slow-release relay BX, being de-energised at contact $tc2$, opens its contact $bx$ and de-energises magnet CCM. Contact $tc3$ prepares a circuit for the lamp IL (Fig. 2). As relay TC and TA are slow-release relays, they remain operated while relay TA changes over its contact $ta1$ (Fig. 3) and locks relay TC via contact $hh9$ to earth. Contact $ta2$ (Fig. 4) takes earth off contact $px4$ to prohibit a delivery of articles in case the customer operates the key FK (Fig. 2) at this stage.

In case the price of the selected article would be priced at a shilling amount, earth from the shilling switch SA3 in pricing unit PU (Fig. 4) operates over a corresponding lead in cable 4, contact bank SS3, contact tc1 and operated contact hh2 the relay TA. This relay then energises relay TC over contact ta1 as mentioned above.

When the customer has finished his order, he operates the "Finish" key FK (Fig. 2) and energises relay PC which locks itself from earth via operated contacts h3 and pc1, relay PC to battery. Contact pc2 (Fig. 4) closes a circuit for the halfpenny indication in pricing unit PU. As in the example described no provision is made for the collection of halfpennies any price indication has to be raised to the next full penny amount. In this case a contact 1hp of relay 1HP in the pricing unit PU (Fig. 4) is closed and over the contacts pc2 and px1 the relay 1H is operated to add another halfpenny to the added up price. If the added up price does not show any halfpenny amount, contact 1hp is open and closing of contact pc2 is without effect.

At contact pc3 (Fig. 2) the circuit for relay M (Fig. 1) is interrupted and the keying unit is put out of action as earth is removed from the keysets at contact m1. Contact pc4 (Fig. 3) de-energises slow-release relay PX which is released after a short time delay. Contact pc5 (Fig. 4) connects relay SC with wiper SS3 and contact pc6 (Fig. 3) connects relay DD via contact t3 with wiper PS4.

The release of relay PX breaks the circuit for ½d. counting at contact px1 (Fig. 4) and the circuit for the lamp SL (Fig. 2) at contact px5. At contact px3 a circuit is closed for the "Insert now" lamp IL over operated contact tc3. Contact px2 (Fig. 3) connects relay DC over contact t2 with wiper PS3, while contact px4 (Fig. 4) prepares a circuit for relay SG.

The added up price of an order is indicated at a lamp indicator LL connected with the pricing unit PU and the customer inserts now this amount minus his deposit indicated at the lamp indicator LP into the appropriate slots of the coinbox.

When the customer inserts pennies in the corresponding slot dsc (Fig. 2) the switch PS (Fig. 3) is stepped up in the same way as described before when the deposit was put in. As relays MC, CA and CB are still energised the lamp indicator LP which showed the 6d. deposit now steps the indications on to the higher values. As soon as another six pennies have been inserted, relay T is operated again and over contact t1 energises relay MS from earth via contact sr6, operated contacts t1 and ca1, relay MS to battery. Contact ms1 by-passes contact ca1 and contact ms2 interrupts the circuit for relays MC and CA which now release. At contact ms3 (Fig. 4) earth is applied to magnet SM to step switch SS up one step. Over operated contact hh4 and wiper and contact bank SS2 the lamp 1S in the lamp indicator LS lights up to show that one shilling (including the deposit) has been paid so far. Switch PS returns to normal as magnet PM is actuated over wiper PS1 and interrupter pm, and further pennies inserted in slot dsc (Fig. 2) step this switch up again. As relay CB (Fig. 3) is now de-energised contact ca3 is open), the lamp indicator LP shows now the amounts from 0d. to 5d., until another six pennies have been paid.

If the customer inserts a sixpence coin instead of six single pennies relay MD (Fig. 2) operates as mentioned before and over contacts md and ca1 (Fig. 3) energises relay MS in the described manner.

As provision is made at the coinbox for the insertion of shilling coins, these coins operate over slot contact ssc (Fig. 2) a relay S. Over contact s1 (Fig. 4) which operates parallel to contact ms3, the magnet SM of switch SS is stepped up. As contact hh6 is open the magnet SM cannot operate over its self-interrupting contact sm. A further contact s2 (Fig. 3) connects earth to relay H in case the customer has inserted a shilling instead of sixpence for his first deposit.

The added up price of an order is marked on the switches SA3 and PA3 (Fig. 4) of the pricing unit PU, earth being applied to one of the leads in cable 4 corresponding to the shilling amount and to one of the leads in cable 5 corresponding to the penny amount of the added up price. Checking of the amount tendered against the price indicated by the price indicator is carried out in the following manner resulting in the operation of relay SG (Fig. 4).

In case the penny indication is less than sixpence one of the leads of cable 5 leading to contact bank PS3 is earthed and when by inserting pennies the wiper is stepped up to this contact relay DC will energise over wiper PS3, contacts t2 and px2, relay DC to battery. At contact dc1 a locking circuit for relay DC is closed (in case the customer inserts another penny and steps the switch PS up further). Contact dc2 (Fig. 4) prepares a circuit for relay SG which will operate when the shilling checking relay SC has operated as described later. Alternatively when sixpence has been tendered by the customer relay DE is energised over one of the closed contacts mc2 to mc7 and closes its contact de (Fig. 4) in preparation for the operation of relay SG.

If the penny indication exceeds fivepence one of the leads in cable 5 leading to the contact bank PS4 is earthed and when the switch is stepped up a circuit is closed over this lead, wiper PS4, contact t3, operated contact pc6, relay DD to battery. This relay locks itself over contact dd1 (similar to relay DC) and at contact dd2 (Fig. 4) prepares a circuit for relay SG. As in this case sixpence had to be tendered previously relay CA has closed its contact ca4.

A check on the shilling amounts is carried out in a similar way. If no shilling amounts occur in the added up price of an order, earth is applied over switch SA3 of the pricing unit PU (Fig. 4) to the first lead in cable 4 and thus via operated contact hh8 to wiper SS3 and from there as soon as contact pc5 is closed (as described earlier) to relay SC. This relay closes its contacts sc1 and sc2. The latter contact finalises the circuit for relay SG, which then operates its contacts sg1 to sg4. If any shilling amount is marked at the switch SA3, the corresponding lead in cable 4 is earthed and when switch SS is stepped up in accordance with the money tendered by the customer, the relay SC is energised when the wiper SS3 reaches this earthed lead.

Cases might occur where the customer has not enough small change and thus tenders a shilling instead of a smaller penny amount. To prohibit relay SC from releasing when the switch SS is stepped up further, the contact sc1 connects relay SD in series with relay SC. Relay SD closes its contact sd and operates relay SC directly over contact r2 irrespective of the position of the penny checking relays DC, DD and DE.

In case the added up price of the order is less than or equal to the amount originally deposited in the coinbox relay SG is energised as soon as the "Finish" key FK is operated. The circuit for this relay is then closed from earth via operated contact h5, contacts ta2, px4 and r2, relay SG to battery.

The operation of relay SG as described above initiates the release of the selected articles to the customer and the re-setting of all circuits to their initial position. Over contact sg1, a circuit is closed for another winding of relay SG from earth via wiper and contact bank TS1 of switch TS, contact sg1, relay SG to battery. It may be mentioned here that the wipers of switch TS normally rest on the last contact as shown in Fig. 4. Contact sg2 interrupts the lead to relay R to prohibit operation of this relay over the refund button RB (Fig. 2). At contact sg3 (Fig. 2) the circuit for the normally operated slow-release relay AX is interrupted and until relay AX releases a new circuit is temporarily closed from earth via contact sg3, normally operated contact ax, magnet CCM to battery. The magnet transfers now the amount tendered by the customer after selection to a collecting receptacle, so that no refund is possible any more. While passing into the receptacle the coins operate temporarily the collecting contact cbd. As contact sg4 is closed, relay SR is energised over contacts cbd and sg4 and establishes a locking circuit for itself over contacts sr1 and sg4. Contact sr2 breaks the circuit for the "Ready" lamp RL and lights up the "Wait" lamp WL to indicate to the customer that he has now to wait for the delivery of his order. At contact sr3 (Fig. 4) a circuit is closed from earth over interrupter-contact tm, contact sr3, wiper TS3, magnet TM to battery so that by conventional means switch TS steps its three wipers around to the first contact of the respective contact banks. Contact sr5 (Fig. 3) interrupts the locking circuit for the relay H, and contact sr6 interrupts the circuit for the relays CA and MC (in case sixpence were counted on the penny switch PS). As soon as contact hh5 closes again, a homing circuit for switch PS is closed from earth over wiper and contact bank PS1, interrupter-contact pm, magnet PM to battery. When the wiper reaches its first contact this circuit is interrupted and a new circuit is established from earth via wiper and first contact of PS1, lead 3 (Fig. 4) wiper and contact bank SS1 of switch SS, contact hh6, interrupter-contact sm, magnet SM to battery. Over this circuit the switch SS is stepped back to its initial position, in which this stepping circuit is interrupted and the circuit from wiper PS1 over lead 3 is now extended over wiper SS1, operated contact sr4, contact r5 and lead 6 (Fig. 3) to relay OC in the totalling unit TU. This relay transfers the price indications to the message registers, clears the pricing unit and re-sets all circuits connected therewith. These circuits are not shown in detail as they do not form part of this invention.

As mentioned before the wipers of the switch TS (Fig. 4) have been stepped on to the first contacts of the three contact banks by the closing of contact sr3. As soon as the wiper TS2 reaches this position the motor MR in the conveyor unit CU is started to move a conveyor belt, carrying the selected articles which were released from storage previously, in the direction of the delivery counter. The circuit for relay SG is maintained over wiper TS1, operated contact sg1 and the second winding of relay SG. While the selected articles are delivered to the customer the magnet TM steps the switch TS slowly forward. The stepping circuit for magnet TM is closed from battery over magnet TM, wiper and contact bank TS3, slow-release relay TN to earth. Magnet TM cannot operate in series with relay TN, but relay TN operates and interrupts at contact tn the normally operated slow-release relay TX which with a certain time delay closes its contact tx, thus short circuiting relay TN and energising magnet TM. Relay TN releases with a time delay, closes its contact tn and energises relay TX which removes the short circuit for relay TN and releases magnet TM. The whole cycle of operations repeats itself until the wiper TS3 has reached the last contact connected with relay TN and on release of magnet TM is stepped forward one step. Then magnet TM is directly connected over wiper TS3 with self-interrupting contact tm to earth and thus the switch TS is quickly stepped further. The number of contacts of the contact bank connected with relay TN depends on the time delay necessary to deliver all selected articles from the conveyor belt to the customer.

When the wipers of switch TS have reached the last but one contact of the corresponding contact banks, the circuit for relay SG is interrupted at wiper TS1 and the motor MR in the conveyor unit CU is stopped at wiper TS2. At contact sg4 (Fig. 2) the circuit for relay SR is broken and thus another circuit is closed for magnet TM (Fig. 4) over wipers TS3, contacts sr3 and tm to earth. Thus magnet TM steps all wipers of switch TS one step further where they come to rest until relay SR operates again in connection with the next order. The release of relays SG and SR has restored all circuits to their initial position so that the whole system is ready for the next selection.

In the embodiment of the invention described above provision is made to refund the money under certain circumstances. A refund button RB (Fig. 2) is provided at the coinbox which not only operates electrical circuits but is mechanically connected with the coin receiving mechanism to return coins which have not yet been finally collected by the coin collecting magnet CCM. Until a selection of articles valued more than 6d. has been made a refund of the deposit is possible as relay TC (Fig. 3) has not operated yet. Thus the customer has the choice either to pay 6d. for his order which is valued less than 6d. or to regain his sixpence deposit.

When the customer has selected articles with an added-up price higher than sixpence (his deposit), and after having inserted further coins decides not to take the selected articles he can get a refund of his mony except the deposit which is already collected by magnet CCM. In this case all circuits must be restored to normal and the selected articles on the conveyor belt have to be returned to store. When the customer presses the refund button RB (Fig. 2) a circuit is closed from earth via button RB, lead 2 (Fig. 4), contact sg2, relay R to battery. This relay operates similar to relay SG. At contact r1 a circuit is closed for the second winding of relay R over wiper TS1. Contact r2 interrupts the energising circuit for relay SG and contact r3 (Fig. 2) energises relay SR for the release of the various circuits as described above. Contact r4 reverses the direction of motor MR to move the conveyor belt backwards and to deliver the articles thereon back to the store. As the price indication of the selected articles is not to be added up at the totalling unit, the lead 6 to the totalling unit TU is interrupted at contact r5 and the circuit from contact sr4 is extended over contact r5 to the relay TF in the pricing unit PU to restore the pricing unit to normal. In the same way as mentioned before the switch TS is stepped around and ultimately breaks the circuit for relay R at wiper TS1, so that the next order can be selected.

In case the customer does neither collect his order nor operate the refund button RB the circuits are restored when the next customer operates the start key SK (Fig. 2). As mentioned before the relay PD closes its contact pd4 (Fig. 4) and as in this case the relays TA and H are energised their contacts ta2 and h5 are in the operated position and relay R is energised fulfilling all the functions mentioned above.

To enable the shopkeeper to decide whether he wants to collect the deposit in cases of misuse or whether he gives his customers a possibility to recover the deposit in any case where they have made a mistake in their selection of articles simple switching means can be provided in the connection between the coin collecting magnet CCM (Fig. 2) and contact tc2. When this circuit over contact bx is interrupted the magnet CCM will only collect the coins when the full amount of a selected order has been paid and relay SG (Fig. 4) has operated its contacts sg3 (Fig. 2) as described above.

To summarise the normal operation of the system illustrated, the customer commences by operating the Start Key SK (Fig. 2). This brings up the Deposit Lamp DL to indicate that the deposit should now be inserted and prepares the various circuits for operation. The customer now inserts his deposit of sixpence in the coinbox. The deposit is counted by switch PS (Fig. 3) and if correct operates relay M (Fig. 1) to earth the selecting means ready for use and to light lamp GL (Fig. 1) to indicate that the customer can start his selection. The amount of the deposit is indicated at LP (Fig. 3) or, if a shilling has been inserted, at LS (Fig. 4).

The customer selects the articles he requires by operating keys K1—K50 (Fig. 1). These control selector switch KS, which transmits coded indications of the articles required to the Selecting Relay Group SRG (Fig. 1) which in turn initiates the release of the selected articles to the conveyor unit CU (Fig. 4).

An indication of the price of each article selected is transmitted to the Pricing Unit PU (Fig. 4), which registers on switches PA3 and SA3 the progressive total value of the customer's order. The total is indicated at LL (Fig. 4).

When he has selected the articles he requires, the customer operates the Finish Key FK (Fig. 2), which de-energises relay M, thus removing earth from the keyset, and brings up the "Insert Now" lamp 1L (Fig. 2). He then inserts coins which, with his deposit, will pay for the articles selected. The coins inserted are counted by the penny counting switch PS (Fig. 3) and the shilling counting switch SS (Fig. 4), and the progressive total of the amount paid by the customer (including deposit) is indicated at LP and LS. When this total equals or exceeds the price of the selected articles, relay SG (Fig. 4) operates to cause the conveyor unit CU to deliver the articles to the customer, a check of switches PS and SS against switches PA3 and SA3 (in the Pricing Unit PU) being carried out over the leads in cables 4 and 5.

The foregoing description in connection with the drawings shows the invention by way of example only. Modifications in the circuits can be made within the scope of this invention whenever this might be necessary to suit individual requirements, for example, when instead of the currency mentioned above coins of other currencies or tokens representing the values of the different kinds of articles shall be used.

We claim:
1. A system for vending articles of various character, comprising dispensing means for the selection and dispensing of a plurality of articles, means to prohibit said dispensing means from selection and freeing means to free said dispensing means for selection; adding means electrically connected with said dispensing means to receive an indication of the value of each selected article and to add up the values of articles belonging to one order; and coin or token operated means including switching means connected with said dispensing means to op- erate said freeing means to free said dispensing means for selection upon the tendering as deposit of coins or tokens of a predetermined value, counting means to count the total value of coins or tokens received by said coin or token operated means, and switching means including electrical connections between said counting means, said adding means and said dispensing means for establishing an operating circuit for actuating said dispensing means to dispense the selected articles of an order when the value of coins or tokens counted by said counting means is at least equal to the values of said selected articles added up by said adding means.

2. A system for vending articles of various character as claimed in claim 2 and in which said adding means and said counting means include rotary switches and lamp indicators for each denomination to indicate progressively the value of selected articles of one order and the amount in coins or tokens tendered to said coin or token operated means, the contacts of the rotary switches of said counting means being electrically connected with corresponding contacts of the rotary switches of said adding means to establish electrical circuits for the dispensing of selected articles when the wipers of corresponding switches pass corresponding contacts connected with each other.

3. A system for vending articles of various character comprising dispensing means for the selection and dispensing of a plurality of articles; means to prohibit said dispensing means from selection and freeing means to free said dispensing means for selection; adding means electrically connected with said dispensing means to receive an indication of the value of each selected article and to add up the values of said articles belonging to one order; and coin or token operated means including a coin or token receiving device, counting means electrically connected therewith and with said dispensing means and said adding means and operable upon receipt of coins or tokens by said receiving device to effect the counting of the amount of coins or tokens received and to operate said freeing means to free said dispensing means for selection when coins or tokens of a predetermined value have been received as deposit, and switching means including electrical connections between said counting means, said adding means and said dispensing means for establishing an operating circuit for actuating said dispensing means to dispense the selected articles of an order when the value of coins or tokens counted by said counting means is at least equal to the values of said selected articles added up by said adding means, and for restoring said coin or taken operated means to its initial condition.

4. A system for vending articles of various character comprising dispensing means for the selection and dispensing of a plurality of articles; means to prohibit said dispensing means from selection and freeing means to free said dispensing means for selection; adding means electrically connected with said dispensing means to add up the values of selected articles belonging to one order; and coin or token operated means including a coin or token receiving device, counting means electrically connected therewith and with said dispensing means and said adding means and operable upon receipt as deposit of coins or tokens of predetermined value by said receiving device to operate said freeing means to free said dispensing device for selection, switching means and electrical connections therefrom to said counting means and operable thereby to deliver articles selected for one order upon receipt by said receiving device of further coins or tokens in accordance with the total value of said selected articles added up by said adding means, and a finishing switch electrically connected with said switching means and operable for the delivering of selected articles of one order when the total value of said selected articles is less than said predetermined value of coins or tokens received by said receiving device.

5. In a system for vending articles of various character the combination of a plurality of releasing means one for releasing each type of article handled; selecting means electrically connected with said releasing means for their selective operation in accordance with coded designations allotted to said articles; means to prohibit operation of said selecting means and freeing means to free said selecting means for operation; and conveyor means to collect and deliver released articles, with coin or token operated means operable upon the tendering as deposit of coins or tokens of predetermined value to operate said freeing means to free said selecting means and upon tendering of further coins or tokens to actuate said conveyor means for the delivery of released articles; and individual keys for each kind of article to be selected, said keys being arranged in groups, relay means and a rotary switch associated with each group and electrically connected with said selecting means and operable upon operation of any one of said keys to hunt for said operated key and to transmit a coded designation representing the selected kind of article to said selecting means for the release of said kind of article by said releasing means, said relay means blocking the selection of further articles by keys of the same group until the previously selected article has been released.

6. A system for vending articles of various character, comprising a plurality of releasing means one for releasing each type of article handled; selecting means electrically connected with said releasing means for their selective operation; means to prohibit operation of said selecting means and freeing means to free said selecting means for operation; adding means operable upon the release of each article to receive an indication of the value thereof and to add up the values of articles belonging to one order; conveyor means to collect and deliver released articles; and coin or token operated means including counting means to count the values of coins or tokens tendered and electrical connections between said counting means and said adding means, said counting means being adapted to operate said freeing means to free said selecting means upon the tendering as deposit of coins or tokens of a predetermined value, and to actuate said conveyor means for the delivery of released articles upon the tendering of coins or tokens of value at least equal to the sum of the values added by said adding means.

7. A system for vending articles of various character as claimed in claim 6 and including indicating lamps electrically connected with said counting means to indicate progressively the various steps necessary for the vending of selected articles.

8. A system for vending articles of various character comprising dispensing means for the selection and dispensing of a plurality of articles; adding means electrically connected with said dispensing means to receive an indication of the value of each selected article and to add up the values of said articles belonging to one order; and coin or token operated means including a coin or token receiving device, counting means electrically connected therewith and with said dispensing means and said adding means and operable upon receipt of coins or tokens by said receiving device to effect the counting of the amount of coins or tokens received and to free said dispensing means for selection when coins or tokens of a predetermined value have been received as deposit, and switching means electrically connected with and operable by said counting means after the selection of articles of one order upon the receipt of coins or tokens in accordance with the total value of said selected articles indicated by said adding means to deliver said articles and to restore said coin or token operated means to its initial condition, said switching means including a timing device consisting of a rotary switch and two slow release relays so electrically connected that the stepping movement of said rotary switch depends on the combined action of said slow release relays, said timing device restoring said coin or token operated means to its initial condition after a time interval determined by said rotary switch and said slow release relays in accordance with the time necessary to deliver all selected articles of one order.

9. A system for vending articles of various character, comprising a plurality of releasing means one for releasing each type of article handled; selecting means electrically connected with said releasing means for their selective operation; means to prohibit operation of said selecting means and freeing means to free said selecting means for operation; adding means operable upon the release of each article to receive an indication of the value thereof and to add up the values of articles belonging to one order; conveyor means to collect and deliver released articles; coin or token operated means including counting means to count the values of coins or tokens tendered and coin holding means to keep coins or tokens received by said coin or token operated means in an intermediate position and operable to release them to a final position, and means including electrical connections between said counting means, said selecting means and said conveyor means to operate said freeing means to free said selecting means upon the tendering as deposit of coins or tokens of a predetermined value and to actuate said conveyor means for the delivery of released articles upon the tendering of coins or tokens of value at least equal to the sum of the values added by said adding means; and relay means electrically connected with said counting means, said adding means and said coin holding means to operate said coin holding means as soon as the total value added by said adding means and the total value counted by said counting means coincide.

10. A system for vending articles of various character as claimed in claim 9 and including a refund button associated with said coin or token operated means, means electrically connected with and operable by said refund button to refund coins or tokens held in said intermediate position by said coin holding means, and relay means electrically connected with and operable by said refund button to restore said adding means and said counting means to their initial position.

11. A system for vending articles of various character, comprising a plurality of releasing means one for releasing each type of article handled; selecting means electrically connected with said releasing means for their selective operation; means to prohibit operation of said selecting means and freeing means to free said selecting means for operation; adding means operable upon the release of each article to receive an indication of the value thereof and to add up the values of articles belonging to one order; conveyor means to collect and deliver released articles; and coin or token operated means including a starting switch and relay means connected therewith and operable thereby to bring said coin or token operated means into working condition, means including counting means to count the values of coins or tokens tendered and electrical connections between said counting means, said selecting means and said conveyor means, to operate said freeing means to free said selecting means upon the tendering as deposit of coins or tokens of a predetermined value, and to actuate said conveyor means for the delivery of released articles upon the tendering of coins or tokens of value at least equal to the sum of the values added by said adding means.

12. A system for vending articles of various character comprising a plurality of releasing means one for releasing each type of article handled; selecting means electrically connected with said releasing means for their selective operation; means to prohibit operation of said selecting means and freeing means to free said selecting means for operation; adding means electrically connected with said releasing means to add up the values of selected articles belonging to one order; conveyor means to collect and deliver released articles; and coin or token operated means including switching means and electrical connections therefrom to said selecting means to operate said freeing means to free said selecting means upon the tendering as deposit of coins or tokens of a predetermined value, reversible driving means for said conveyor means, and further switching means including electrical connections between said adding means, said further switching means and said reversible driving means for actuating said reversible driving means to move said conveyor means in one direction for the delivery of released articles when the total value of the tendered coins or tokens is at least equal to the sum of the values of said released articles, and to move said conveyor means in the opposite direction when the tendered amount is lower than the total value of said released articles.

References Cited in the file of this patent

UNITED STATES PATENTS

| | | |
|---|---|---|
| 2,000,804 | Wehren | May 7, 1935 |
| 2,083,947 | Furber | June 15, 1937 |
| 2,251,073 | Shann | July 29, 1941 |
| 2,354,896 | Weiler | Aug. 1, 1944 |
| 2,555,486 | Harris | June 5, 1951 |
| 2,663,398 | Skillman | Dec. 22, 1953 |

FOREIGN PATENTS

| | | |
|---|---|---|
| 511,285 | Great Britain | Aug. 10, 1939 |